United States Patent
Davis

(10) Patent No.: US 6,867,947 B2
(45) Date of Patent: Mar. 15, 2005

(54) RETRACTABLE LOW PROFILE HEAD BRUSH ASSEMBLY FOR CLEANING READ/WRITE HEADS IN A MEDIA TAPE DRIVE

(75) Inventor: David Michael Davis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 10/228,604

(22) Filed: Aug. 27, 2002

(65) Prior Publication Data

US 2004/0042120 A1 Mar. 4, 2004

(51) Int. Cl.$^7$ ................................................ G11B 5/41
(52) U.S. Cl. ....................................................... 360/128
(58) Field of Search ................................. 360/128, 122; 15/DIG. 12, DIG. 13; 242/332.4, 352.4

(56) References Cited

U.S. PATENT DOCUMENTS

| | | | |
|---|---|---|---|
| 5,793,580 A | | 8/1998 | Argumedo et al. |
| 5,859,755 A | | 1/1999 | Griffin et al. |
| 6,067,211 A | * | 5/2000 | Chliwnyj et al. ........... 360/128 |
| 6,208,488 B1 | * | 3/2001 | Yamakawa et al. ......... 360/128 |
| 6,215,618 B1 | | 4/2001 | Anderson et al. |
| 6,252,739 B1 | | 6/2001 | Todd et al. |
| 6,359,751 B1 | | 3/2002 | Groel et al. |
| 6,433,961 B1 | * | 8/2002 | Tsuchiya et al. ............ 360/128 |
| 6,697,212 B2 | * | 2/2004 | Tsuchiya ..................... 360/95 |

* cited by examiner

*Primary Examiner*—Angel Castro
(74) *Attorney, Agent, or Firm*—Jean M. Barkley; Dillon & Yudell LLP

(57) ABSTRACT

A threader assembly for a tape drive has a retractable, low profile head brush assembly that is articulated into and out of wiping contact with the tape head. The head brush assembly is integrated into the threader assembly such that the same components used to load and unload the media tape also articulate the head brush assembly. The head brush assembly includes a set of bristles that are mounted to a brush arm. The head brush assembly has a cleaning position for placing the bristles in contact with the tape head. When the head brush assembly is in the cleaning position, the tape head is cleaned through oscillation of the head via a coarse track following actuator. The head brush assembly also has a storage position wherein the entire head brush assembly is pivotally retracted away from the tape head without interfering with other components of the threader assembly.

17 Claims, 12 Drawing Sheets

RETRACTABLE LOW PROFILE HEAD BRUSH ASSEMBLY FOR CLEANING READ/WRITE HEADS IN A MEDIA TAPE DRIVE

BACKGROUND OF THE INVENTION

1. Technical Field

The present invention relates in general to an improved data storage and retrieval device, and in particular to a retractable, low profile head brush design for cleaning the read/write head in a media tape drive for improved performance in a data storage and retrieval device.

2. Description of the Prior Art

Data recording devices, such as data tape drives, record information to and read information from media, such as the data tape of a tape cartridge. Data tape drives typically are used in conjunction with, for example, a data storage and retrieval system such as a robotic library, wherein removable media cartridges are selectively transported in an automated environment for the purpose of input/output (I/O).

As the performance requirements of tape drives has continued to increase, the tape heads used to read data from and write data to the tape have become more sensitive to the environment in which they operate. Consequently, even slight amounts of contamination in a tape drive system can cause the tape heads to be susceptible to decreased performance or damage. One source of contamination in tape drives is the debris that is generated and accumulates due to the motion of the media tape relative to the tape drive components. Such debris is particularly problematic when it accumulates on the read/write heads of the tape drive. Tape heads have become even more susceptible to debris as the written density of media tape has increased. Along with increased media tape density, miniaturization of components continues to be a priority. Moreover, tape heads must be reliably maintained for repeatable operation. Thus, tape heads must be cleaned on a regular basis to overcome the problems associated with residual debris.

In the prior art, one solution to this problem is to employ a brush to periodically clean the heads. The current level of tape head sensitivity to debris and the performance requirements of the data themselves, essentially forces the tape heads to be cleaned on a very consistent basis. The head is typically cleaned or "swept" one time per tape load or unload. For example, one type of prior art device utilizes a brush that performs a linear sweep on the head. "Linear sweep" refers to sweeping the head in a longitudinal direction of the head (i.e., perpendicular to the tape path). See, e.g., U.S. Pat. No. 6,252,739 to Todd, and U.S. Pat. No. 5,793,580 to Argumedo. Alternatively, a head brush can be held stationary against the tape head while the head dithers in a direction perpendicular to the tape path to accomplish the same objective. Still another prior art devices utilize cartridges of cleaning tape that are run through the tape drive to clean the tape heads. Examples of these devices are found in U.S. Pat. No. 6,215,618 to Anderson, and in U.S. Pat. No. 5,859,755 to Griffin. Although each of these designs are workable, an improved head brush design for cleaning tape heads in a data storage and retrieval system would be desirable.

SUMMARY OF THE INVENTION

One embodiment of a threader assembly for a tape drive has a retractable, low profile head brush assembly that may be articulated into and out of wiping contact with the tape head. The head brush assembly is integrated into the threader assembly such that some of the same components used to load and unload the media tape also articulate the head brush assembly. In one version, the head brush assembly comprises a set of bristles that are mounted to a brush arm. The head brush assembly has a cleaning position wherein the bristles are in contact with the tape head. When the head brush assembly is in the cleaning position, the tape head is cleaned through the oscillation of the head via its existing coarse track following actuator. The head brush assembly also has a storage position wherein the entire head brush assembly is pivotally retracted away from the tape head without interfering with other components of the threader assembly.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and therefore are not to be considered limiting of its scope as the invention may admit to other equally effective embodiments.

DETAILED DESCRIPTION OF THE PRESENT INVENTION

Figure 11:
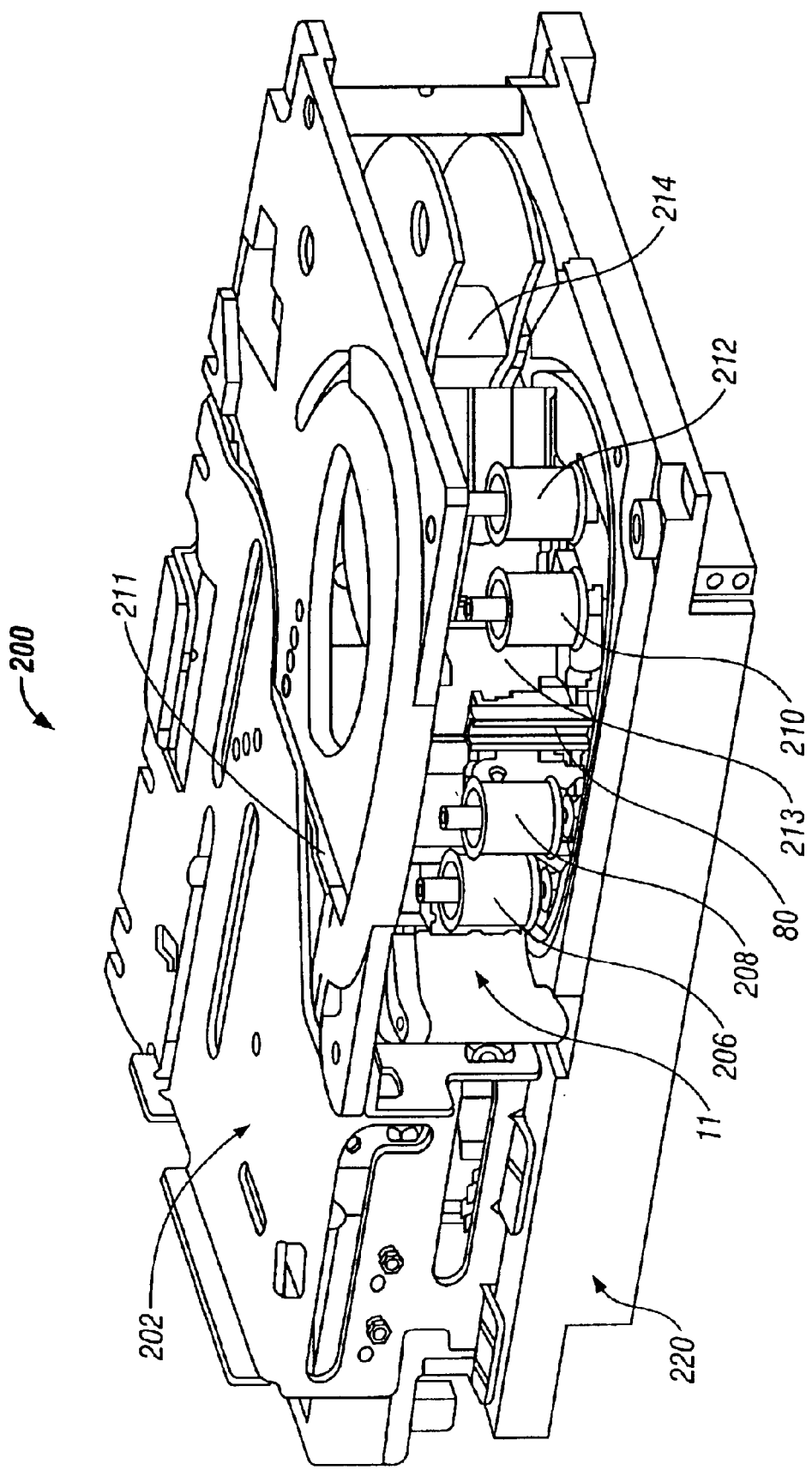
FIG. 11 is an isometric view of a media tape drive having the threader assembly of FIGS. 1–10 and is constructed in accordance with the present invention.
Figure 12:
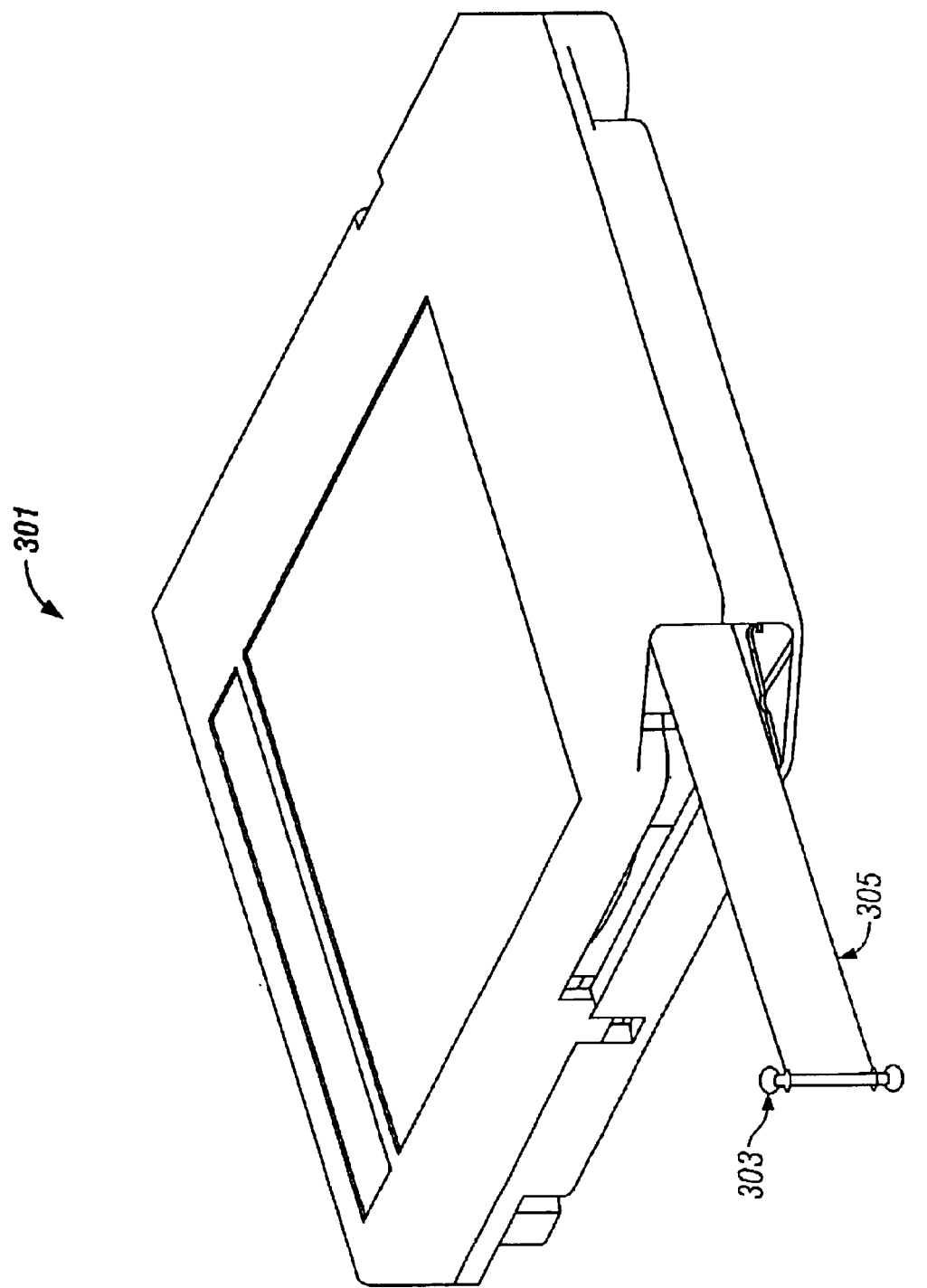
FIG. 12 is an isometric view of a removable data tape cartridge used in conjunction with the tape drive of FIG. 11.

Referring first to FIG. 11, a reel-to-reel media tape drive 200 is shown with some components removed for clarification. Tape drive device 200 is usually located inside of a robotic library (not shown). Tape drive 200 may be any one of, for example, a family of tape drives using a single-reel tape cartridge, such as the IBM 3480, IBM 3490, IBM 3590, and Linear Tape Open (LTO) tape drives. Tape drive 200 has a cartridge loader 202 for receiving a single-reel tape cartridge 301 (see FIG. 12). Tape drive 200 also has a threader assembly 11 for threading and unthreading a media tape 305 of cartridge 301 around the tape guide rollers 206, 208, 210, 212, and into the take-up reel 214. One end of media tape 305 is provided with a leader pin 303 to facilitate these processes. Tape guide rollers 208 and 210 support the tape 305 as it flies over a magnetic tape transducer head 80 for reading data from and writing data to tape 305 in response to a control processor 213. Each of the components of tape drive 200 are mounted to a structural support frame 220. Tape drive device 200 is typically mounted within a device enclosure (not shown) in order to protect the tape drive device 200 from dust and debris, as well as extraneous air currents that could disturb the way the magnetic tape passes over the magnetic head 80.

Referring now to FIGS. 1–10, a portion of one embodiment of threader assembly 11 is shown. Threader assembly 11 is provided with a novel, retractable head brush assembly 50, which is one subject of the present invention. To illustrate its range of motion and for ease of understanding, head brush assembly 50 is illustrated in three different pivotal positions, which are enumerated as 50A, 50B, and 50C. Thus, head brush assembly 50 does not comprise three separate brushes; rather, numerals 50A–C represent a few positions in the range of motion of head brush assembly 50. In position 50A, head brush assembly 50 is oriented in a direction that is parallel to a longitudinal (length-wise) direction of head 80, which is transverse to a direction of travel of tape 305. In position 50C, head brush assembly 50 is oriented in a direction that is perpendicular or transverse to the longitudinal direction of head 80. Head brush assembly 50 is constructed and operated in this manner in order to attain a low-profile or "half-height" format with a 22.5 mm head. As a result, head brush assembly 50 is extended and retracted such that it requires virtually no additional space in the vicinity of the head 80.

Figure 1:
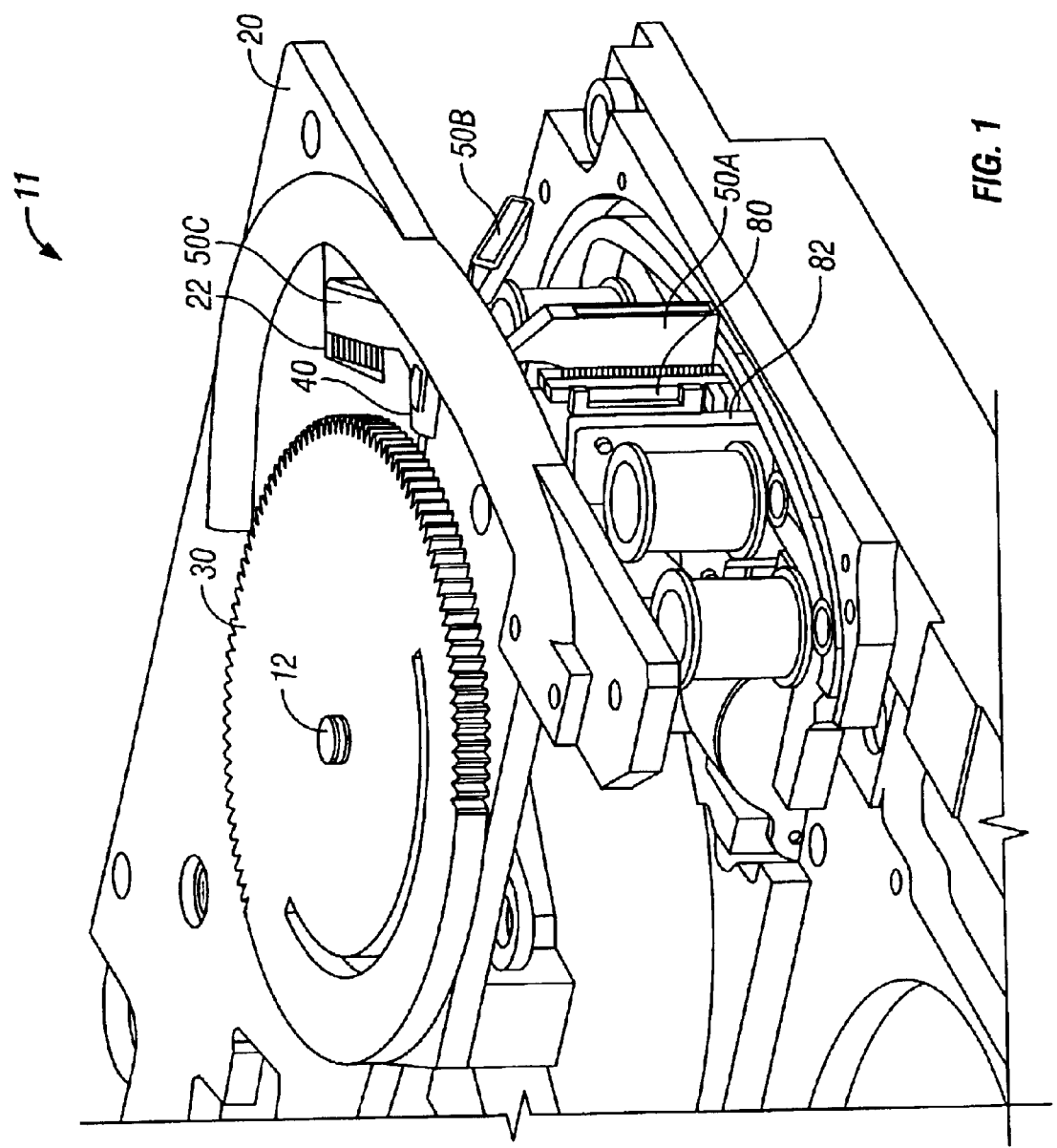
FIG. 1 is an isometric view of one embodiment of a tape drive having a head brush assembly constructed in accordance with the present invention.
Figure 2:
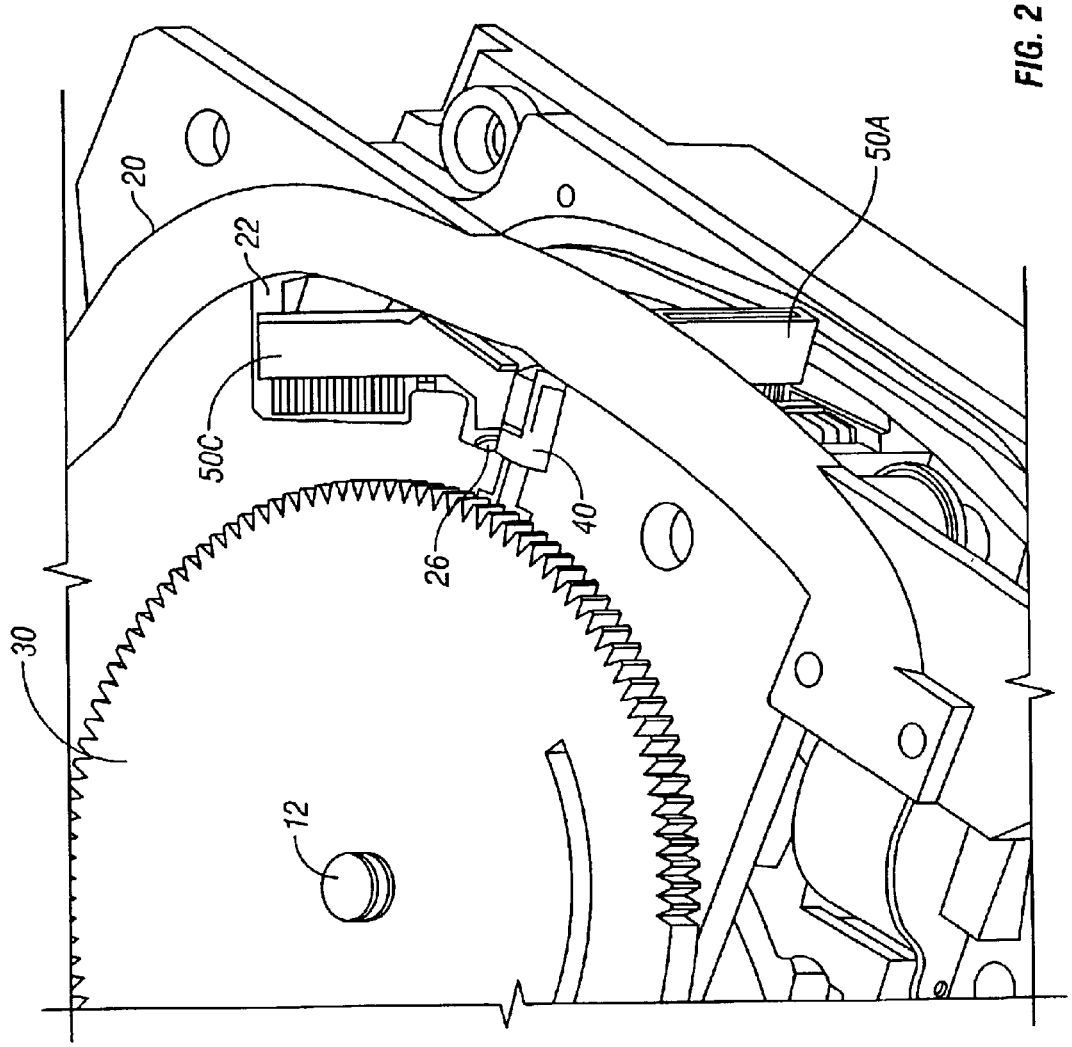
FIGS. 2–10 are alternate isometric views, including partially exploded views in FIGS. 3 and 4, of the tape drive of FIG. 1.
Figure 3:
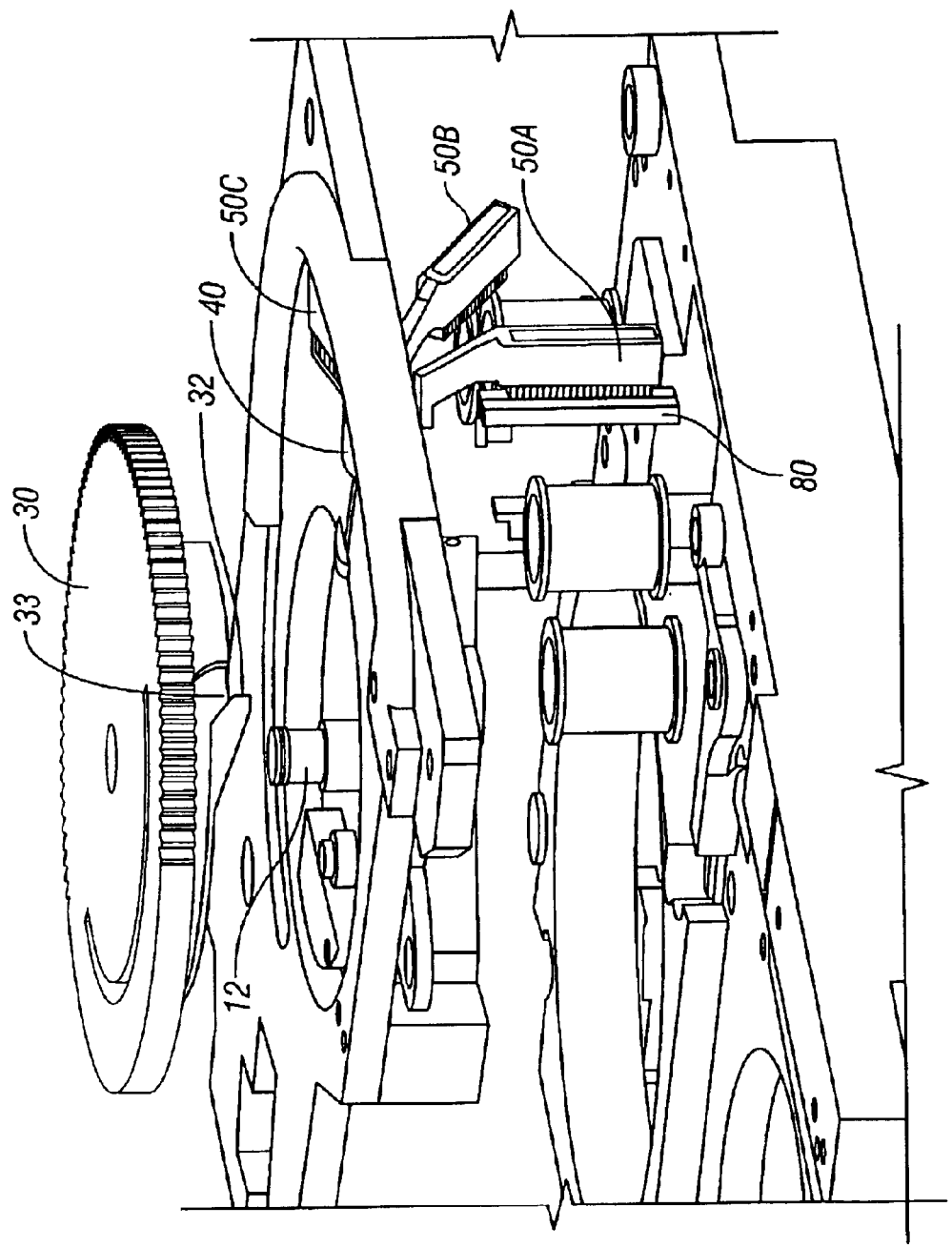
Figure 4:
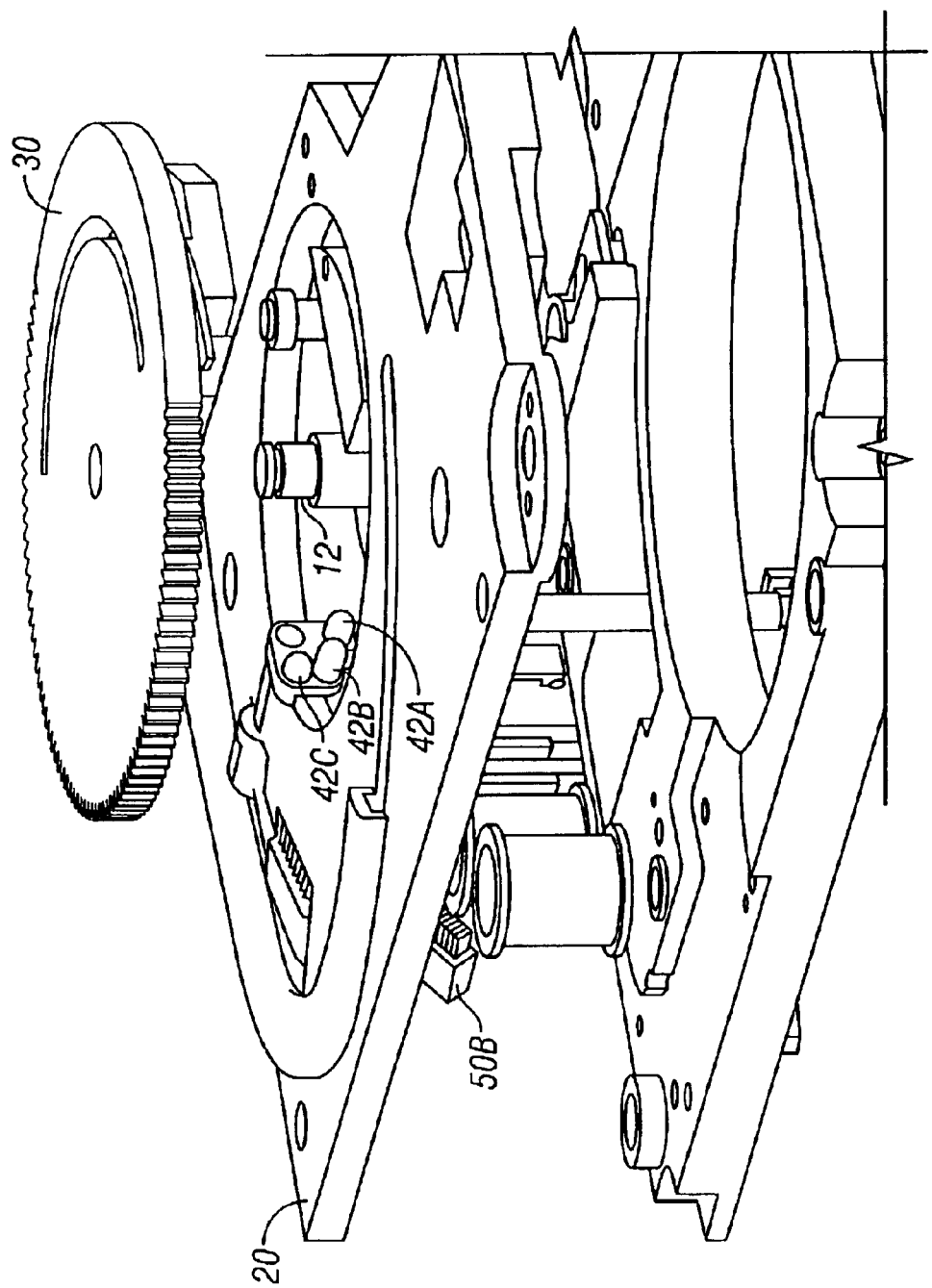
Figure 5:
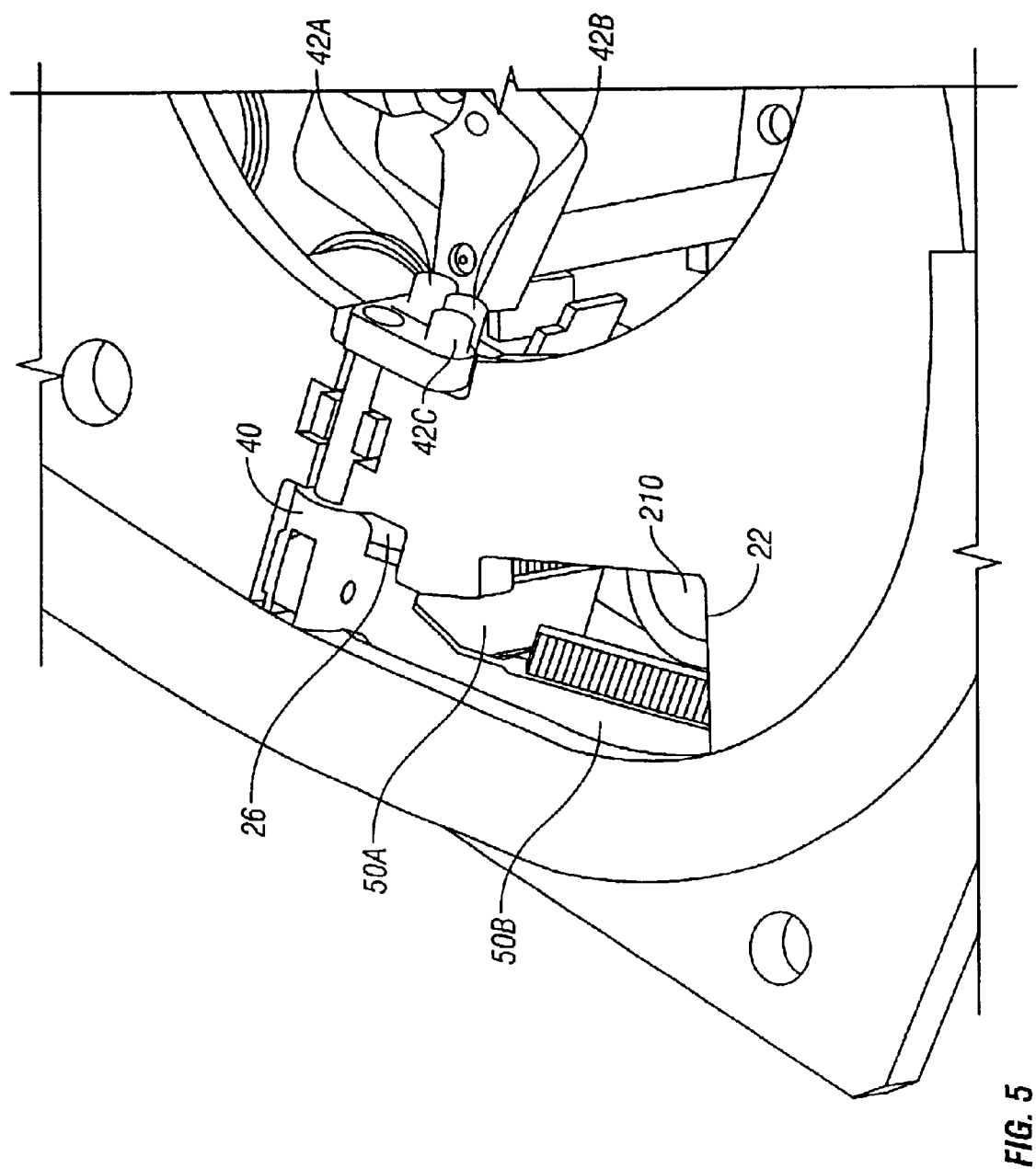
Figure 6:
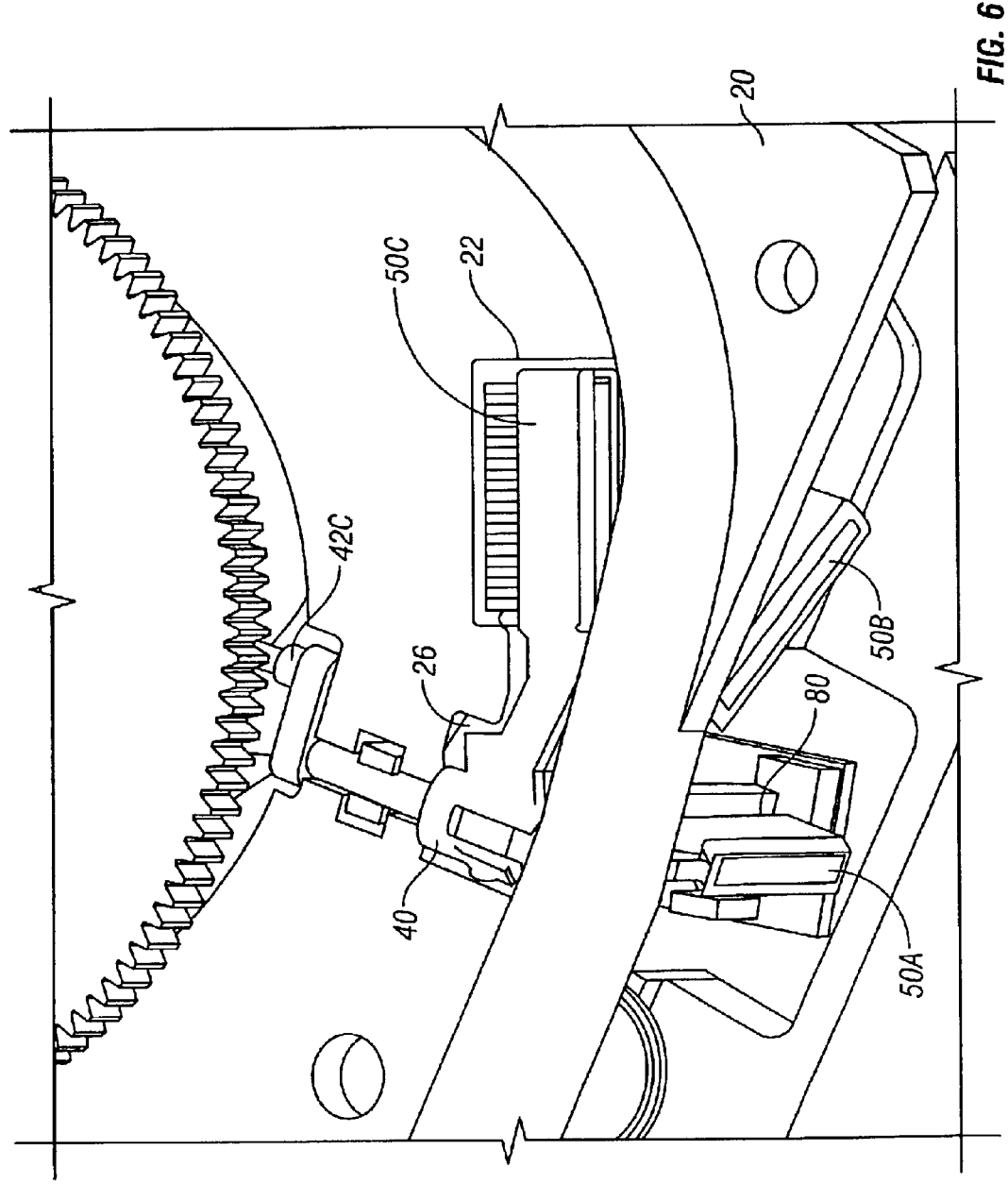

In FIG. 1, threader assembly 11 is illustrated in an unloaded position for unloading media tape. Threader assembly 11 has a threader actuation gear 30 that may be rotated in a clockwise direction to a parked position. When threader actuation gear 30 is in this position, head brush assembly 50 is in its parked or "cleaning" position, which is illustrated at numeral 50A. When media tape 305 is initially loaded into threader assembly 11, a thread mechanism motor 211 (FIG. 11) drives the threader gear 30 in the counterclockwise direction, rotating it about an axis 12, to a threaded position. As threader gear 30 rotates counterclockwise, a threader gear face cam 32 (FIG. 3) extending from the lower surface of threader gear 30 engages a protrusion on and thereby pivots a rotator shaft bell crank 42 (FIG. 4). The protrusion on rotator shaft bell crank 42 seats in a recess 33 (FIG. 3) that is located between threader gear face cam 32 and a body of the threader gear 30. Like head brush assembly 50, rotator shaft bell crank 42 is illustrated in three positions, 42A, 42B, 42C, to display a portion of its range of motion. Rotator shaft bell crank 42 is mounted to and, in turn, rotates a rotator shaft 40 (FIGS. 1–3) in response to actuation by threader gear face cam 32. Rotator shaft 40 is coupled to and rotates the head brush assembly 50 from the cleaning position 50A, through an intermediate position 50B, to a storage position 50C.

Figure 7:
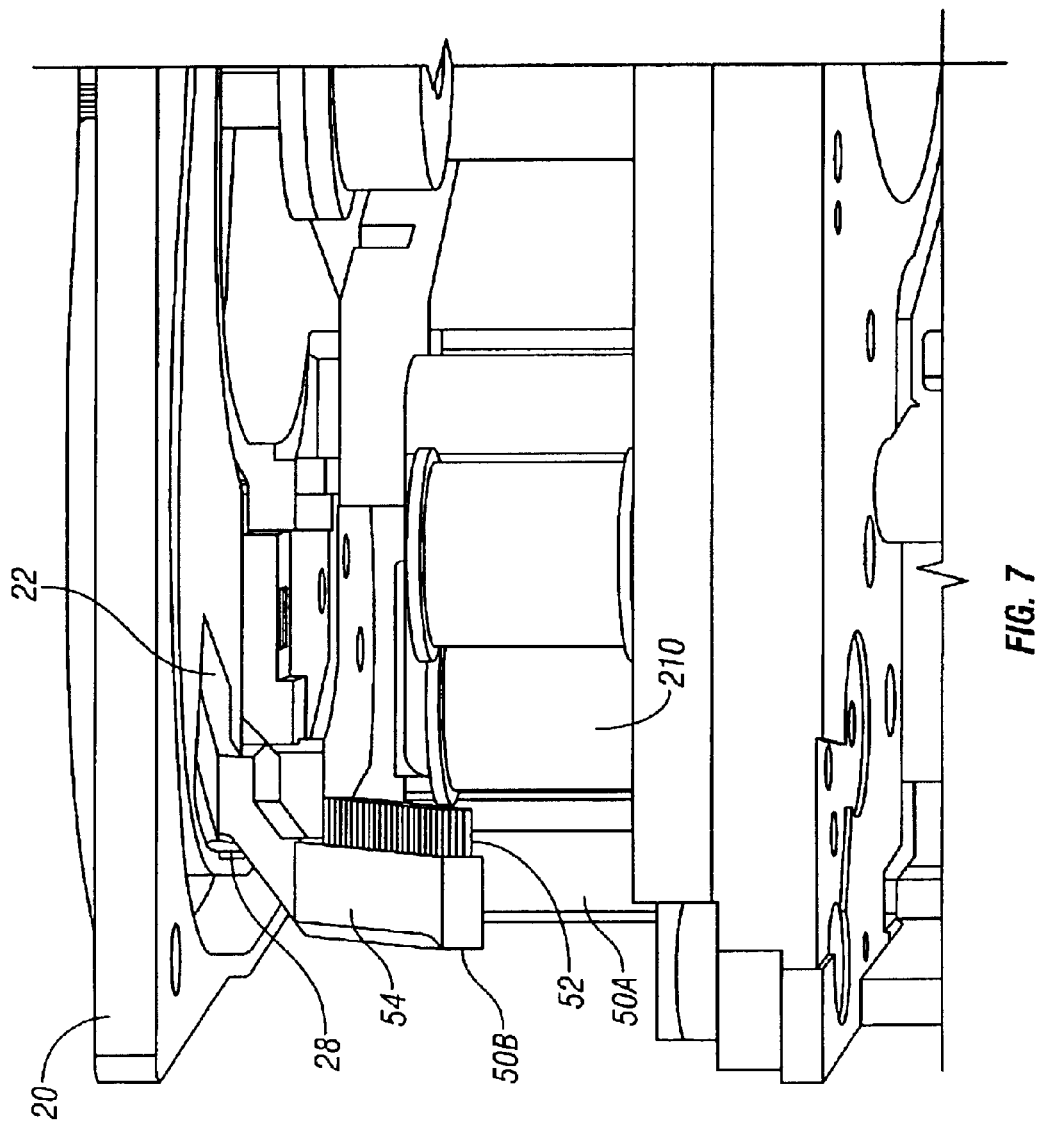
Figure 8:
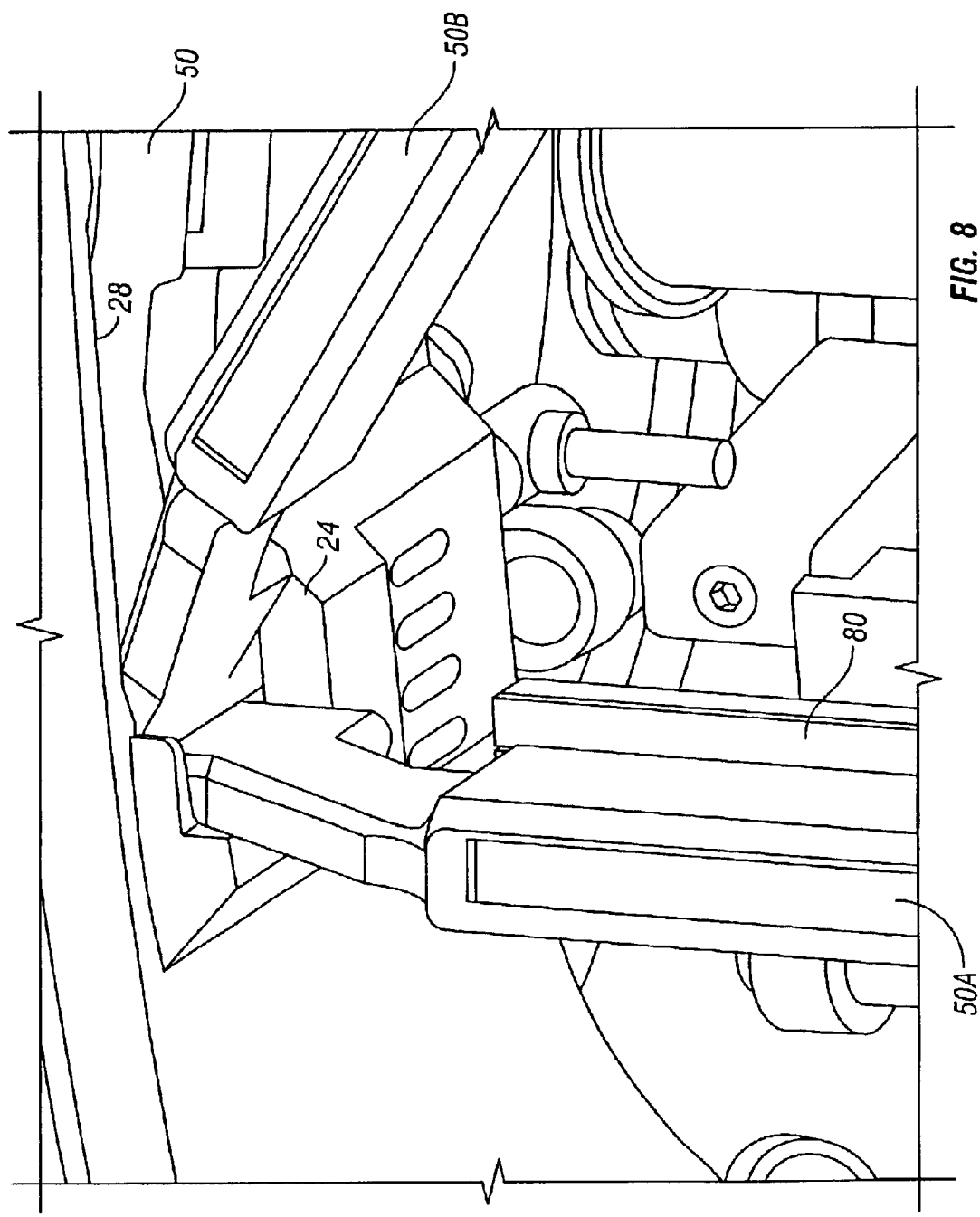
Figure 9:
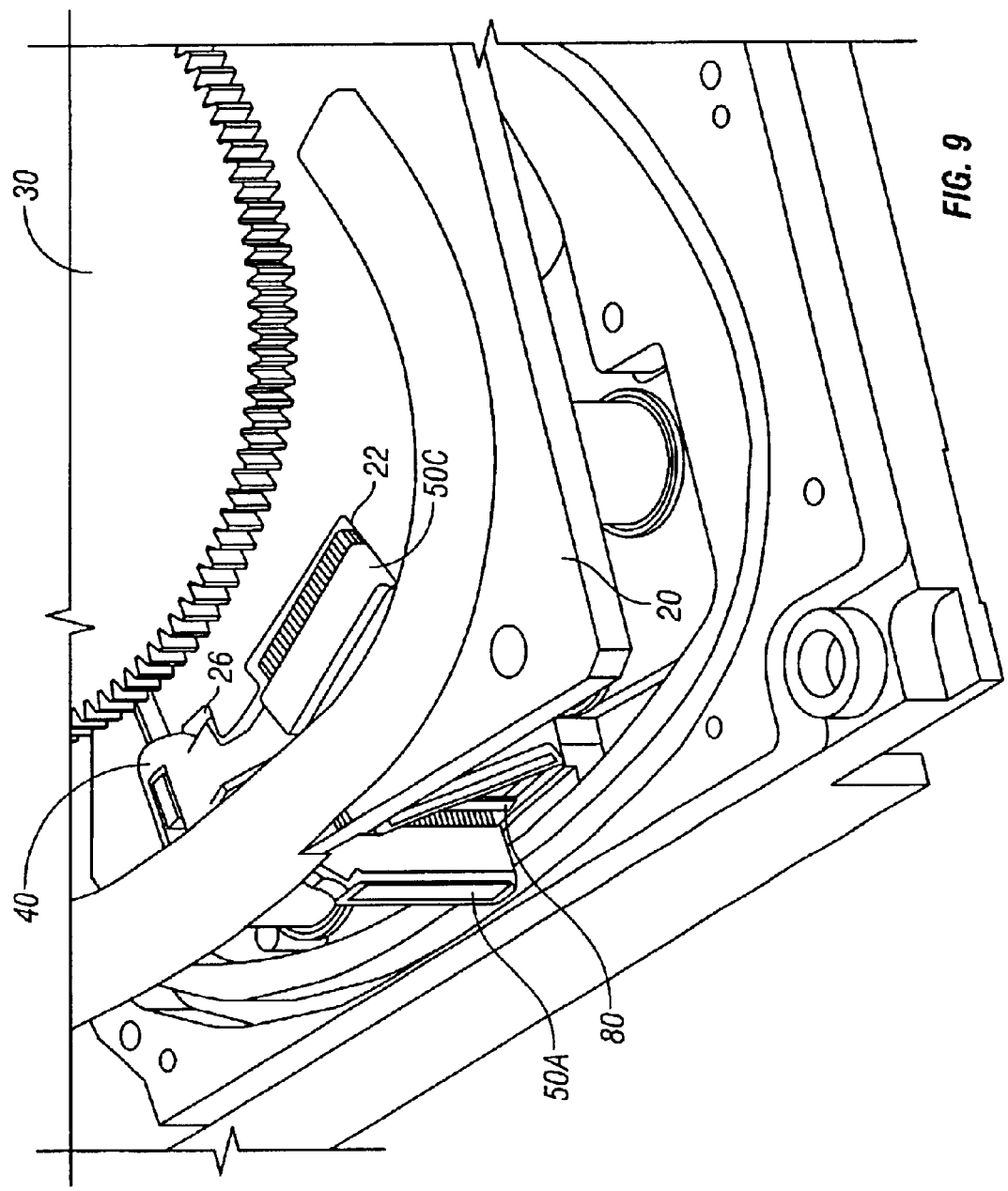
Figure 10:
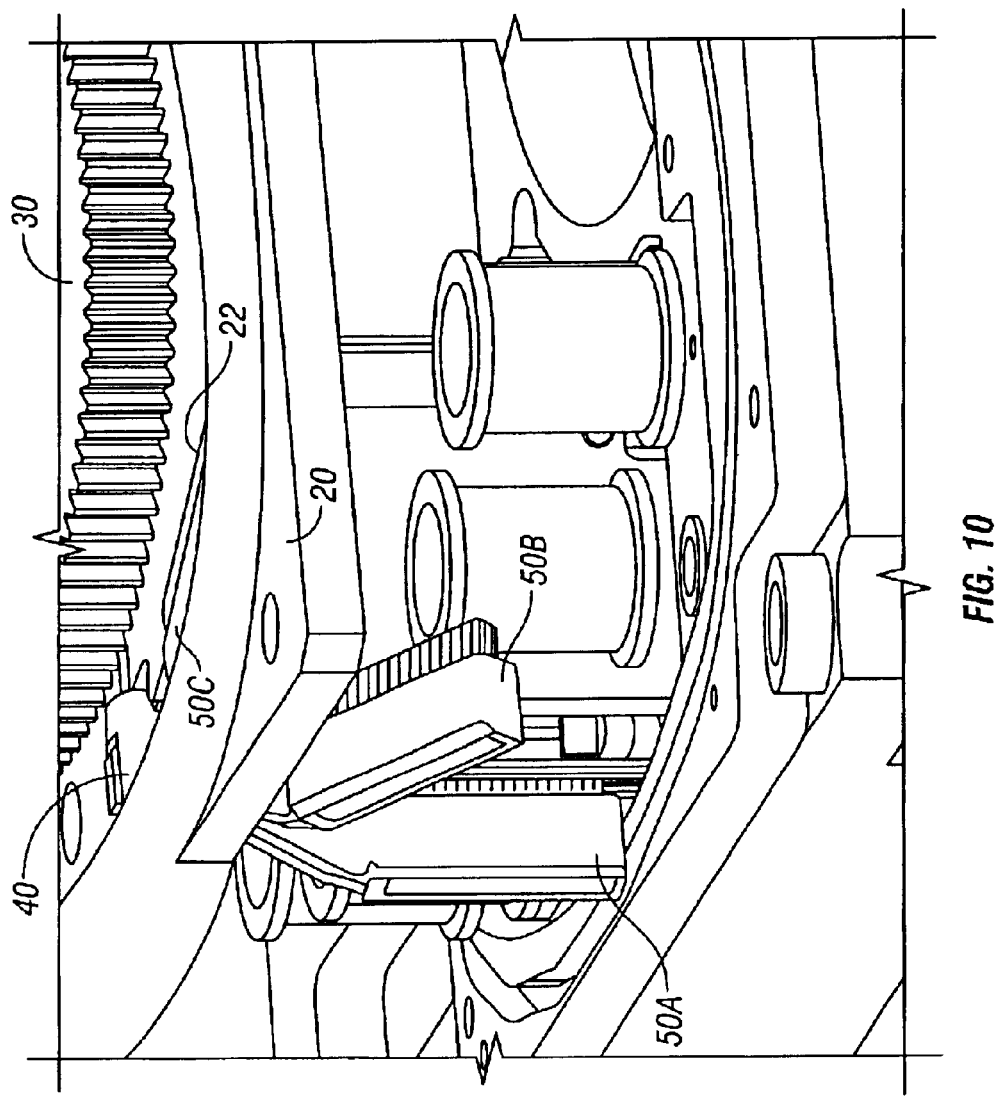

While the head brush assembly 50 is swinging upward from the cleaning position 50A to the storage position 50C, it travels within the confines of a storage slot 22 (FIGS. 2 and 4) located in an upper plate 20. Along the longitudinal walls of the storage slot 22 are camming or biasing features on its inner surfaces 24 (FIG. 8) and 26 (FIGS. 5 and 6), and outer surface 28 (FIG. 7). These surfaces are configured to contact various cam following portions of head brush assembly 50 to precisely articulate head brush assembly 50 through its range of motion. The cam and cam following features combine to articulate head brush assembly through a path or range of motion that is axially out-of-plane with rotator shaft 40 (i.e., the path is not a single-plane arc). As the head brush assembly 50 swings from the cleaning position 50A to the intermediate position 50B, it is unloaded from a surface of head 80 (FIGS. 8 and 10) and directed outward and around (e.g., away from roller 57 in FIGS. 5 and 7) other potentially interfering hardware by surface 24. As head brush assembly 50 rotates further toward the storage position 50C, the cam surface 28 rotates head brush assembly 50 back inward and around the hardware (e.g., toward roller 57), and then to storage position 50C. The storage position 50C is attained before the threader assembly 11 has finished threading the tape.

In the tape unthread process, the threader actuation gear 30 rotates counter-clock wise from the parked position. After the threader assembly 11 clears the tape and leader block from the tape head, face cam 32 (FIG. 3) on threader gear 30 rotates the bell crank 42 (FIG. 4) from its stored position 42C to its cleaning position 42A. Rotating shaft 40 through this return cycle again swings the head brush assembly 50 downward from its storage position 50C through its intermediate position 50B. Again, head brush assembly 50 travels within the confines of the storage slot 22 in the upper plate 20. While rotating the head brush assembly 50 down, the cam surface 24 directs the head brush assembly 50 outward and away from the interfering hardware. After clearing the potentially interfering hardware, and upon further rotation of the head brush assembly 50 to the cleaning position 50A, the cam surface 28 urges the head brush assembly 50 back into interference contact with the air bearing surface of the head 80. Thus, in one embodiment, the threader assembly 11 moves the head brush assembly 50 from the storage position 50C to the cleaning position 50A during tape threading and unthreading processes.

The cleaning of head 80 is accomplished through the vertical oscillation of the head 80 via a coarse track following actuator 82 (FIG. 1) within the head assembly for movement relative to the now stationary head brush assembly 50 in cleaning position 50A. The coarse track following actuator 82 of an LTO-based tape drive 200 typically places the tracks on head 80 on the half-inch width of the tape. Thus, the coarse track following actuator 82 places head 80 within a reasonable reach so that the fine track following actuator (not shown) can enable head 80 to lock on and chase tracks in the tape. In one embodiment, head 80 comprises a 22.5 mm head, the tape is 12.7 mm wide, and the coarse track following actuator 82 moves head 80 across the tape path by +/−9 mm, while never exposing the surface of the tape to the edge of head 80. Coarse track following actuator 82 uses this same range of motion to move head 80 relative to head brush assembly 50 in the longitudinal direction. The fine track following actuator typically performs fine actuation of head 80 at a higher frequency with a range of approximately +/−0.050 mm.

In one version of the invention, the cleaning cycle for head 80 is performed only on its air bearing surface (ABS), and immediately after tape usage. If the tape does not touch head 80, it does not have to be cleaned. With the threading system of the present invention, the brush is typically "parked" against the head in a static state. The coarse track following actuator 82 may be periodically cycled at preprogrammed idle set points to provide additional cleaning for any collecting debris. However, it is unusual for debris to gather on the ABS of head 80 with the head brush assembly 50 parked against the head As best shown in FIG. 7, the head brush assembly 50 itself comprises a subassembly of bristles 52 that are mounted to a brush arm 54. It is the bristles 52 of head brush assembly 50 that physically contact head 80 for cleaning purposes. The proximal end of brush arm 54 is mounted to shaft 40. In one version of the invention, bristles 52 are formed from a conductive carbon/nylon fiber (approximately 3800 fiber count per bristle set) that is crimped with a shell or strip of stainless steel shell, and then sheared to a length of approximately 16.5 mm, as measured from brush arm 54. Bristles 52 are then slidably mounted and adhesively bonded in brush arm 54.

The present invention has several advantages including the ability to significantly reduce the size and space required for a head cleaning assembly. A head brush utilized in a threader assembly and constructed in accordance with the present invention has a very low profile and may be fully retracted away from the tape head. The head brush is efficiently integrated into the threader assembly such that the same components used to load and unload the media tape also articulate the head brush. In its storage position, the entire head brush assembly is pivotally retracted away from the tape head without interfering with other components of the threader assembly, thereby greatly reducing packaging volume requirements. In addition, the present invention is mechanically actuated and operated by the movement of pre-existing components of the tape drive, and therefore only requires a slight mechanical reconfiguration of the tape drive without modification of the existing electrical circuitry of the tape drive.

While the invention has been shown or described in only some of its forms, it should be apparent to those skilled in the art that it is not so limited, but is susceptible to various changes without departing from the scope of the invention.

What is claimed is:

1. A tape drive for processing a media tape wound on a tape cartridge, comprising:
    a structural support frame;
    a cartridge loader mounted to the structural support frame for receiving the tape cartridge;
    a threader assembly mounted to the structural support frame for conveying the media tape relative to the tape cartridge, and between the cartridge loader and the tape drive;
    a transducer head for reading data from and writing data to the media tape, wherein the transducer head is coupled to the structural support frame and has an air bearing surface;
    a head brush assembly mounted to the structural support frame and mechanically linked and being responsive to the threader assembly to movement between a cleaning position wherein the head brush assembly contacts the transducer head, and a storage position wherein the head brush assembly is free of contact with the transducer head;
    wherein when the head brash assembly is located in the cleaning position, relative motion of the transducer head with respect to the bead brush assembly cleans debris from the air bearing surface of the transducer head; and
    wherein the transducer head defines a longitudinal direction that is transverse to a direction of travel of the media tape, such that the head brush assembly is parallel to the longitudinal direction when in the cleaning position, and perpendicular to the longitudinal direction when in the storage position.

2. The tape drive of claim 1, further comprising a track following actuator coupled to the transducer head, wherein the air bearing surface is cleaned by oscillating the transducer head with the track following actuator while the head brush assembly is stationary and in the cleaning position.

3. The tape drive of claim 2, further comprising means for periodically cycling the track following actuator to oscillate the transducer head at pre-programmed idle set points to provide cleaning of the air bearing surface for additional debris.

4. The tape drive of claim 1, wherein the threader assembly moves the head brush assembly from the storage position to the cleaning position during media tape threading and unthreading processes.

5. The tape drive of claim 1, further comprising a storage slot in the structural support frame, the storage slot having a plurality of biasing features for contacting portions of the head brush assembly to articulate the head brush assembly through a non-planar arc to avoid contact with other potentially interfering hardware associated with the tape drive.

6. The tape drive of claim 1, wherein the threader assembly comprises an actuation gear having a gear face cam for engaging and pivoting a rotator shaft bell crank that rotates a rotator shaft to which the head brush assembly is coupled for pivotal movement between the cleaning and storage positions.

7. The tape drive of claim 1, wherein the head brush assembly is aligned with the transducer head in the longitudinal direction when the head brush assembly is in the cleaning position, such that the relative motion between the head brush assembly and the transducer head also occurs in the longitudinal direction.

8. A tape drive for processing a media tape wound on a tape cartridge, comprising:
    a structural support frame;
    a cartridge loader mounted to the structural support frame for receiving the tape cartridge;
    a threader assembly mounted to the structural support frame for conveying the media tape relative to the tape cartridge, and between the cartridge loader and the tape drive;
    a transducer head for reading data from and writing data to the media tape, wherein the transducer head is coupled to the structural support frame and has an air bearing surface;
    a head brush assembly mounted to the structural support frame and mechanically linked and being responsive to the threader assembly for movement between a cleaning position wherein the head brush assembly contacts the transducer head, and a storage position wherein the head brush assembly is free of contact with the transducer head;
    a storage slot in the structural support frame, the storage slot having a plurality of biasing features for contacting portions of the head brush assembly to articulate the head brush assembly through a non-planar arc to avoid contact with other potentially interfering hardware associated with the tape drive;
    a track following actuator coupled to the transducer head, wherein the air bearing surface is cleaned of debris by oscillating the transducer head with the track following actuator while the head brush assembly is stationary and in the cleaning position; and
    wherein the transducer head defines a longitudinal direction that is transverse to a direction of travel of the media tape, such that the head brush assembly is parallel to the longitudinal direction when in the cleaning position, and perpendicular to the longitudinal direction when in the storage position.

9. The tape drive of claim 8, further comprising means for periodically cycling the track following actuator to oscillate the transducer head at pre-programmed idle set points to provide cleaning of the air bearing surface for additional debris.

10. The tape drive of claim 8, wherein the threader assembly moves the head brush assembly from the storage position to the cleaning position during media tape threading and unthreading processes.

11. The tape drive of claim 8, wherein the threader assembly comprises an actuation gear having a gear face cam for engaging and pivoting a rotator shaft bell crank that rotates a rotator shaft to which the head brush assembly is coupled for pivotal movement between the cleaning and storage positions.

12. The tape drive of claim 8, wherein the head brush assembly is aligned with the transducer head in the longitudinal direction when the head brush assembly is in the cleaning position, such that the relative motion between the head brush assembly and the transducer bead also occurs in the longitudinal direction.

13. A method of cleaning an air bearing surface of a transducer head in a tape drive for processing a media tape wound on a tape cartridge, comprising:

(a) providing a structural support frame, a cartridge loader for receiving the tape cartridge, and a threader assembly for conveying the media tape relative to the tape cartridge and between the cartridge loader and the tape drive;

(b) mechanically linking a head brush assembly to the threader assembly;

(c) moving the head brush assembly via motion of the threader assembly from a storage position that is free of contact with the air bearing surface to a cleaning position that is in contact with the air bearing surface, wherein aligning the head brush assembly with the transducer head in a longitudinal direction that is transverse to a direction of travel of the media tape, such that the head brush assembly is parallel to the longitudinal direction when in the cleaning position, and perpendicular to the longitudinal direction when in the storage position; and then (d) oscillating the transducer head with respect to the head brush assembly while the head brush assembly is stationary in order to clean debris from the air bearing surface.

14. The method of claim 13, further comprising the step of periodically oscillating the transducer head at pre-programmed idle set points to provide cleaning of the air bearing surface for additional debris thereon.

15. The method of claim 13, wherein steps (c) and (d) occur during media tape threading and unthreading processes.

16. The method of claim 13, wherein step (c) comprises articulating the head brush assembly through a non-planar arc to avoid contact with other potentially interfering hardware associated with the tape drive.

17. The method of claim 13, wherein step (d) comprises oscillating the transducer head also in the longitudinal direction.

* * * * *